(No Model.)
T. GORDON & W. R. SWIFT.
REGENERATIVE GAS BURNER.
No. 422,589. Patented Mar. 4, 1890.
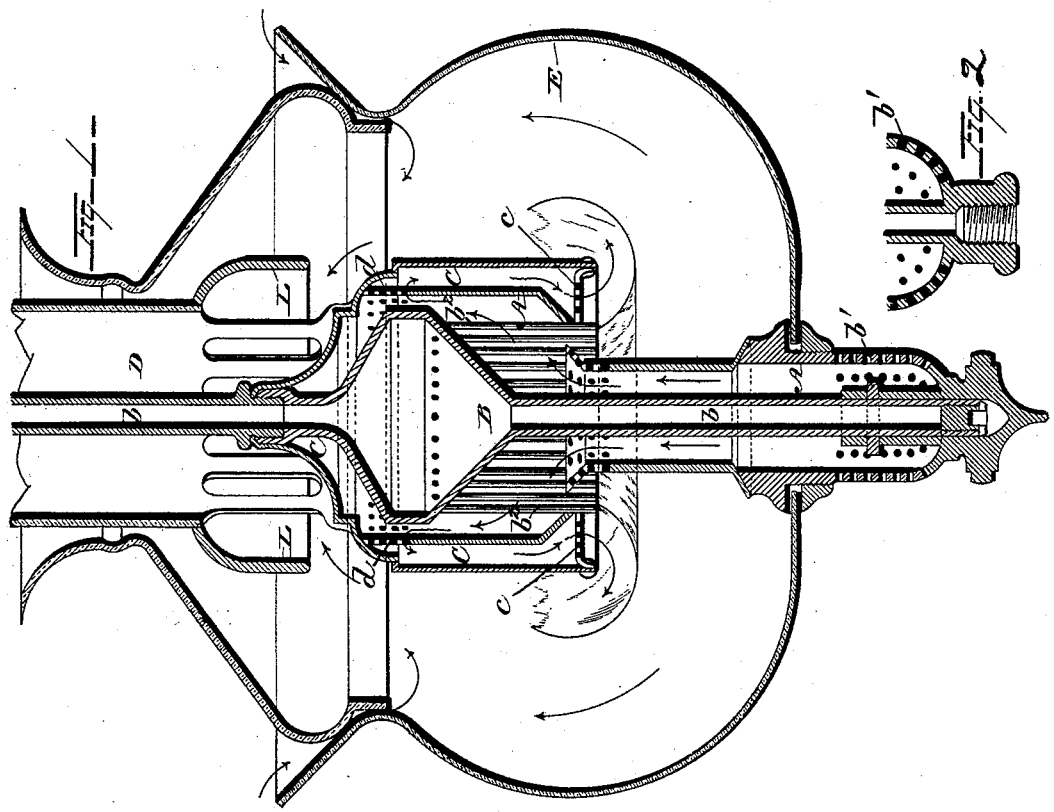
WITNESSES:
INVENTORS
Thomas Gordon
William R. Swift
By
ATTORNEY

UNITED STATES PATENT OFFICE.

THOMAS GORDON AND WILLIAM R. SWIFT, OF PHILADELPHIA, PENNSYLVANIA.

REGENERATIVE GAS-BURNER.

SPECIFICATION forming part of Letters Patent No. 422,589, dated March 4, 1890.

Application filed December 21, 1888. Serial No. 294,349. (No model.)

*To all whom it may concern:*

Be it known that we, THOMAS GORDON and WILLIAM R. SWIFT, citizens of the United States, residing at Philadelphia, in the State of Pennsylvania, have jointly invented certain new and useful Improvements in Regenerative Gas-Lamps, of which the following is a full, clear, and exact description, reference being had to the accompanying drawings, forming a part of this specification.

Our invention relates to regenerative gas-lamps in which the burner is of the inverted form; and it consists, principally, in the novel arrangement relatively to each other of the gas-supply chamber and its inverted gas-burning tubes with the air-supply chamber, the latter being divided into two parts, so as to make two air-chambers of comparatively high and low temperatures, respectively, the latter receiving the current of fresh air from the surrounding atmosphere, directing the same against the sides of the gas-chamber and its tubes, and finally delivering it into the high-temperature chamber, from which it is delivered to the burner-tips at the point of ignition and within the body of the flame. To this end the gas-chamber and its tubes may be inclosed within the initial air-chamber of low temperature.

Finally, our invention consists of several of the details of the apparatus, as hereinafter more particularly described.

The main design and purpose of our invention is to supply an economically-constructed regenerative gas-lamp of the inverted pattern, and in which the main defect in present lamps of that class of overheating of the parts and consequent clogging of the gas-pipes is to a great extent obviated, and this is accomplished by a novel arrangement of the gas-magazine and its annular series of inverted tubes with an air-supply chamber divided into two parts and entirely inclosing within the first part the gas-chamber and its tubes, so as to expose the same to the constant influx of fresh and comparatively cool air.

In the accompanying drawings representing our invention, Figure 1 is a vertical section of an inverted burner illustrating the main features of our invention. Fig. 2 is a modification of the base of the lamp, intended to show how the gas may be introduced from the bottom of the lamp instead of the top.

By reference to Fig. 1 it will be seen that the air-heating chamber, constructed in two parts, consists of the central chamber A, having an extended lower end passing through the base of the lamp and terminating in an end provided with perforations $b'$, which permit the entrance of fresh air in such manner that the volume finds its way in divided quantities upward into the main body of the chamber. The latter is surrounded by an annular casing, (see Fig. 1,) forming the outer air-chamber C, the latter extending downward to a line slightly above the ends of the burner-tips and having a closed base, which is provided with an annular series of perforations $c$, and within which annular row of perforations the annular series of gas-tubes are arranged, their burner-tips projecting through the base of said chamber C. Within the chamber A is arranged a gas-supply magazine B, which is supplied with gas through a conduit $b$, either from the top of the lamp, as shown in Fig. 1, or from the bottom of the lamp by means of a modification shown in Fig. 2. Projecting downward from said gas-magazine B is an annular series of gas-tubes, the burner-tips of which project through the base of the chamber C, as described. The air-chambers A and C, as shown in Fig. 1, are connected with each other at the top by means of a number of perforations or openings $d$ in the dividing-wall between the said two chambers.

An inclosing-globe E, forming the combustion-chamber, of any well-known form, may be employed, which in itself will constitute a conduit for carrying away the waste products of combustion, although in Fig. 1 a separate specifically-constructed conduit D is shown for that purpose. This conduit D has at its base a bell-shaped device L, which tends to bring the heated waste products of combustion into more intimate contact with the outer walls of the chamber C and heat the air therein on its passage to the flame.

The operation of the device is as follows: Gas enters the magazine B and issues from the tips of the burner-tubes $b^2$, thus forming an annular flame which becomes spherical in its tendency to curve around the sides of the outer chamber C, the waste products of combustion passing upward over and around the outer walls of said chamber C to the bell-shaped mouth L of the escape-flue D. The heat from the ignition of the gas thus draws in a constant supply of comparatively cool and fresh air through the perforations $b'$ at the bottom of the lamp up through and into the chamber A, which we have called the "low-temperature" chamber. This air circulates around the gas-tubes $b^2$ and the gas-magazine B in its fresh condition and before becoming heated to any appreciable extent. The tendency, therefore, is to keep the magazine B and its gas-tubes comparatively cool by a constant supply of fresh air. The same air passes upward on its passage through said chamber A and through the exit-openings $d$ at the top thereof into the second air-chamber C, which we have called the "air-chamber of high temperature." On its passage so far described the air will become necessarily warmer, and on coming in contact with the upper parts of the chamber D and passing downward through the same, the sides of which are constantly exposed to the radiation from the flame, and heated also by impingement with the products of combustion, the said air-current will become expanded and heated by the time it reaches the openings $c$, and in that state is discharged directly against the burner-tips and within the body of the ignited flame. The course of travel of the air and gas, as above described, is shown also by arrows in the drawings.

Having thus described our invention, what we claim as new, and desire to secure by Letters Patent, is—

1. The combination, in a regenerative gas-lamp, of a central air-chamber communicating directly with the open air at the base of the lamp, a second air-chamber surrounding the first and communicating therewith at the top and terminating at the base at a point slightly above the ends of the burner-tips, and a gas-magazine and an inverted burner consisting of downwardly-projecting gas-tubes, both inclosed wholly within the central air-chamber, with burner-tips projecting through the base thereof, and a combustion-chamber and escape-flue, substantially as described.

2. The combination, with a gas-magazine and burner-tubes extending downward therefrom and forming an inverted burner, of a central air-chamber of low temperature entirely surrounding the same and communicating from below directly with the open air, and a second air-chamber of high temperature communicating at the top with and surrounding the first and extending downward to a point slightly above the burner-tips, substantially as described.

3. The combination of an inverted burner, an air-chamber inclosing the same and communicating directly with the open air, and an air-heating chamber surrounding the same and extending to the burner-tips and having communicating passages at its upper end with the central air-chamber inclosing the burner, substantially as specified.

4. A regenerative gas-lamp comprising an inclosed gas-chamber having tubes which project downward for some distance from the gas-chamber and form an inverted burner, an air-heating chamber surrounding the gas-chamber to a point slightly above the burner-tips and having outlets for air at its lower end, an air-conduit communicating with the open air at its base, and a fresh-air chamber communicating with the air-conduit and inclosing the gas-chamber, whereby a constant current of cool air is directed against the sides of said gas-chamber, heated on its passage through the hot-air chamber, and from thence delivered to the interior of the flame, substantially as set forth.

5. A regenerative gas-lamp comprising an inclosed gas-chamber having tubes or tips of non-heat-conducting material secured thereto and forming an inverted burner, an air-heating chamber surrounding the gas-chamber to a point slightly above the burner-tips and having outlets for air at its lower end, an air-conduit communicating at its base with the open air, and a fresh-air chamber communicating with the air-conduit and inclosing the gas-chamber, substantially as described.

6. A gas-lamp comprising a central gas-magazine, a series of tubes communicating therewith and forming an inverted gas-burner, an air-heating chamber surrounding said gas-magazine and tubes having air-apertures at its base arranged to discharge air of high temperature to the interior surface of the flame, and a primary air-chamber communicating at its base with the open air and extending upward around the gas-magazine, supplying a current of air of low temperature to the sides thereof and communicating at the top with said air-heating chamber and having air-apertures below the line of the burner-tips arranged to deliver air to the lower or exterior surface of the flame, substantially as described.

In testimony whereof we have hereunto affixed our signatures this 1st day of December, A. D. 1888.

THOMAS GORDON.
WILLIAM R. SWIFT.

Witnesses:
CHAS. C. MATTHEWS,
H. W. McFLATHERY.